Patented May 29, 1928.

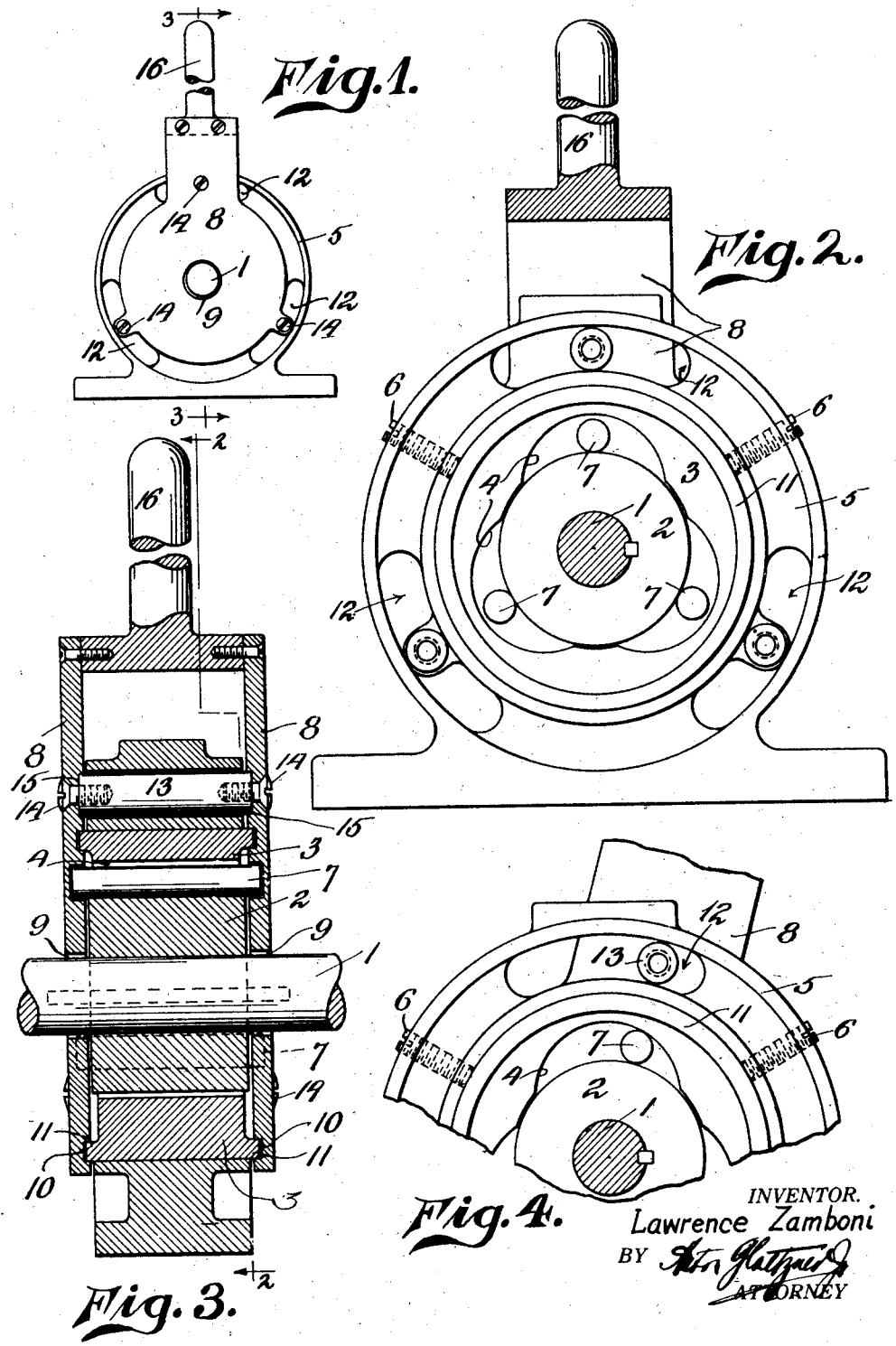

1,671,879

UNITED STATES PATENT OFFICE.

LAWRENCE ZAMBONI, OF PASADENA, CALIFORNIA, ASSIGNOR TO BERKELEY H. EDWARDS, OF PASADENA, CALIFORNIA, AS TRUSTEE FOR UNIVERSAL SAFETY BRAKE COMPANY, OF PASADENA, CALIFORNIA.

BRAKING DEVICE.

Application filed January 18, 1927. Serial No. 161,757.

My invention relates to a means for checking rotary motion and it has especial reference to a device for arresting the motion of bodies or the movement of vehicles. The object of the invention is to provide a simple and effective means for checking the movement of rotatable elements and vehicles in one direction, while permitting the free movement thereof in the opposite direction, thereby enabling vehicles to move from a checked position on an upgrade without that loss of power which is required to hold the vehicle before the movement thereof on the incline is started and after the brakes have been released.

Other objects will appear from the subjoined specification, in connection with the accompanying drawing which is illustrative of a form of embodiment of the invention and in which:

Fig. 1 is a side elevation showing my invention.

Fig. 2 is a sectional elevation taken on line 2—2 Fig. 3.

Fig. 3 is a transverse section taken on line 3—3 Fig. 1, and

Fig. 4 is side view showing the operative position of the braking device.

My invention consists of a rotatable shaft or axle, which may comprise parts of a motor or other vehicle, a stationary element, and means manually or otherwise movable with respect to said shaft or axle and said stationary element whereby the rotation of said shaft or axle in one or the other direction may be restrained without interfering with the free rotary motion of the shaft or axle in the opposite direction.

In a more specific sense, and referring particularly to the form of embodiment of the device illustrated, my invention comprises a rotatable element 1, which may be a power driven or driving shaft or an axle. This shaft 1 may be provided with an enlargement which may be a drum 2 keyed or otherwise locked upon the shaft or axle 1, and although it is preferable to employ an enlargement of the nature stated to provide increased leverage, it will be apparent that the restraining mechanism hereinafter described may be applied directly to the enlargement 2 of the shaft or axle 1. Surrounding the shaft or axle 1, is a stationary element, preferably in the form of a concentric ring 3, provided on the inner circumference thereof, with spaced arcuate recesses 4, which are eccentric to the shaft or axle 1, and hence, in association with the shaft 1 or the drum 2 thereof, present convergent ends. The ring 3 is preferably of steel and is arranged to be inset in a housing 5, which may be of cast iron and to be secured against rotation therein by any desirable means, as set screws 6.

By means of a plurality of pins, rollers or other suitable members 7, which are disposed in the recesses provided in said ring 3, the rotation of the shaft or axle 1 in one direction may be restrained, while the free movement thereof in the opposite direction may take place. These pins or members 7 extend through the arcuate recesses 4 in said ring 3 and the respective ends thereof are journaled in an operating device, which in this instance is shown as comprising plates 8 disposed on the respective sides of the housing 5 and provided with holes 9 through which the shaft or axle 1 is extended. On the inside, each of said plates is formed with an annular groove 10 arranged to fit upon an annular extension 11 provided on each side of said ring 3 and forming bearings upon which said plates 8 are operable. The shaft or axle 1 therefore rotates free of said plates 8.

The plates 8 are provided on the inside with recesses 15, Fig. 2, for the accommodation of the respective ends of a plurality of spaced cylindrical spacers 13, to which said plates are connected by screws 14, which thread in the ends of said spacers 13. These spacers 13 extend through a plurality of arcuate slots 12 equidistantly provided in the housing 5, and they are in a radial line with the pins 7, and in addition to spacing the plates 8, they function to limit the movement thereof. An operating lever 16 may be provided for operating said plates 8.

The housing 5 before referred to is arranged to be secured in rigid position to a convenient part of a vehicle or to a suitable frame, where the device is used in a connection other than with a vehicle, and for this purpose may be provided with flanges 17 for holding or clamping the housing.

In the position of the parts illustrated in Fig. 2, the pins 7 are central of the arcuate recesses 4 and the shaft, axle or other part 1, may rotate freely. When, however, the pins 7 are moved by said operating lever 16 to one side or the other of the arcuate recesses 4 and to such a degree that there is an engagement of them concurrently with the periphery of the rotating part and the convergent ends of the arcuate recesses, as shown in Fig. 4, the rotation of the shaft or axle is checked, in one direction, but the free movement of the shaft or axle in the opposite direction is not interfered with, so long as no pressure is applied to the lever 16 to hold the rollers 7 wedged between the parts 2 and 3. The wedging action of the rollers 7 is practically automatic after they have been moved to engagement with the parts 2 and 3 by the lever. The rotation of the shaft or axle 1 in a direction away from the convergent ends of the arcuate recesses automatically moves the rollers from their wedging position and also moves the lever 16 when not restrained and hence the shaft 1 may turn freely in one direction, while the movement thereof in another direction is restrained by the wedging of the rollers between the parts 2 and 3. Thus a vehicle or a train of vehicles may be restrained against movement in one direction while all the motive power may be employed without loss to propel the vehicle or train. This is especially desirable on grades.

What I claim, is:

A device for checking the rotation of a rotary element comprising in combination with such element, a stationary housing, having an opening through which said element is arranged to extend and provided with recesses, rolling means in and co-operating with said recesses and rotary element to check the forward or backward rotation thereof, said housing provided with bearings, and means operable on said bearings and mounting said rolling means to move same within said recesses.

In testimony whereof I have set my hand.

LAWRENCE ZAMBONI.